United States Patent [19]

Ellis, Jr.

[11] Patent Number: 4,612,090

[45] Date of Patent: Sep. 16, 1986

[54] WATER DEGASIFICATION AND DISTILLATION APPARATUS

[76] Inventor: John C. Ellis, Jr., 1084 Palmer Ave., Larchmont, N.Y. 10538

[21] Appl. No.: 489,767

[22] Filed: Apr. 29, 1983

Related U.S. Application Data

[63] Continuation-in-part of Ser. No. 269,880, Jun. 3, 1981, Pat. No. 4,420,374.

[51] Int. Cl.$^4$ .................. B01D 3/02; C02F 1/04
[52] U.S. Cl. .................... 202/176; 202/180;
202/181; 202/185.5; 202/188; 202/196;
202/197; 202/202; 202/234; 202/264; 99/295;
203/10; 203/20; 203/22; 203/DIG. 16;
203/DIG. 22
[58] Field of Search ............... 202/188, 185.5, 176,
202/190, 264, 197, 181, 180, 83, 190, 194, 196,
195, 202; 203/DIG. 17, 10, 11, DIG. 22, 20,
DIG. 16; 99/295

[56] References Cited

U.S. PATENT DOCUMENTS

| 284,011 | 8/1883 | Herrick | 203/DIG. 17 |
| 771,832 | 10/1904 | Rochlitz | 202/196 |
| 851,045 | 4/1907 | Ullrick | 202/196 |
| 969,625 | 9/1910 | Hoffhine et al. | 202/196 |
| 1,010,508 | 2/1911 | McCune | 202/196 |
| 2,134,048 | 10/1938 | Kessel | 202/189 |
| 2,475,482 | 7/1949 | Clemens | 202/194 |
| 3,020,214 | 2/1962 | Beduhn et al. | 203/20 X |
| 3,020,215 | 2/1962 | Weber | 203/40 X |
| 3,248,305 | 4/1966 | Williamson | 202/197 X |
| 3,479,949 | 11/1969 | Reynolds et al. | 99/295 |
| 3,532,606 | 10/1970 | Sibert | 202/180 |
| 3,838,016 | 9/1974 | Powers | 202/181 |
| 3,935,077 | 1/1976 | Dennison | 202/180 |
| 4,081,331 | 3/1978 | Weiss | 202/181 |
| 4,135,984 | 1/1979 | Kirschmann | 202/83 |
| 4,178,842 | 12/1979 | Vitous | 99/295 |
| 4,187,150 | 2/1980 | Rich | 203/DIG. 16 |
| 4,247,369 | 1/1981 | Bean | 202/181 |
| 4,252,616 | 2/1981 | Glazer | 202/181 |
| 4,261,796 | 4/1981 | Lemoine | 202/181 |
| 4,269,663 | 5/1981 | McFee | 202/202 |
| 4,417,951 | 11/1983 | Stanisic et al. | 202/197 |
| 4,420,374 | 12/1983 | Ellis | 202/176 |

FOREIGN PATENT DOCUMENTS 109551 1/1940 Australia ............... 202/196

Primary Examiner—Wilbur Bascomb
Attorney, Agent, or Firm—Eugene E. Geoffrey, Jr.

[57] ABSTRACT

Water degasification and distillation apparatus having a container for water to be degasified and distilled, a relatively small boiler adjoining said container and having a first conduit extending into the container so that a selected water level in the container will fill said boiler to a selected height, a condenser within the container and immersed in the water contained therein, a second conduit extending from the space above the water in said boiler to the inlet of the condenser, an outlet on the condenser extending through a container wall for discharging degasified and distilled water and heating means in said boiler for heating the water therein.

15 Claims, 15 Drawing Figures

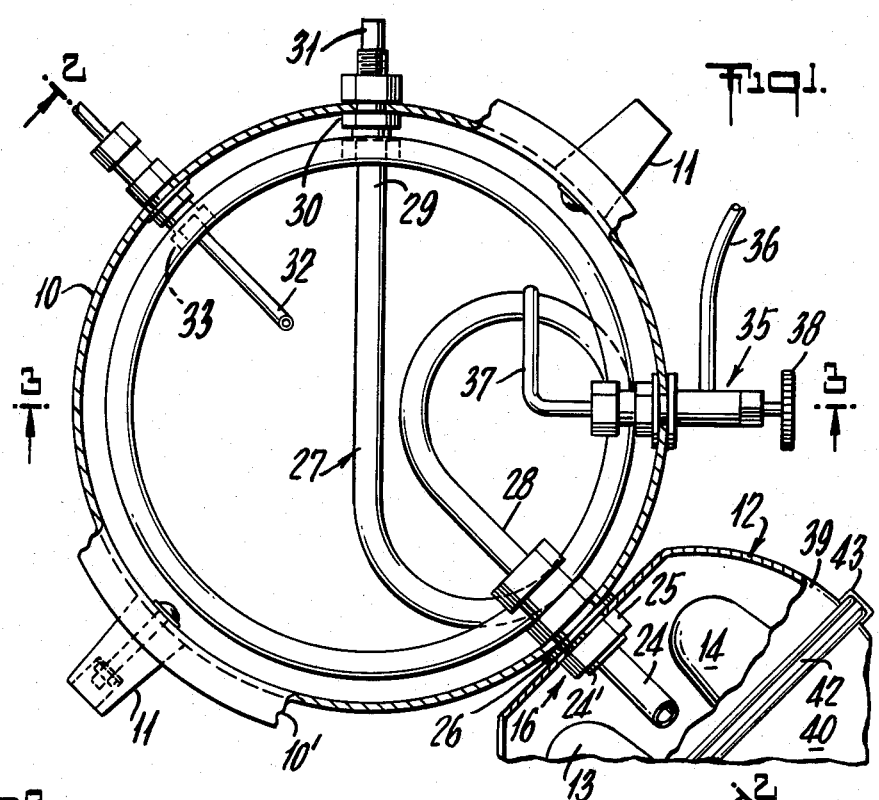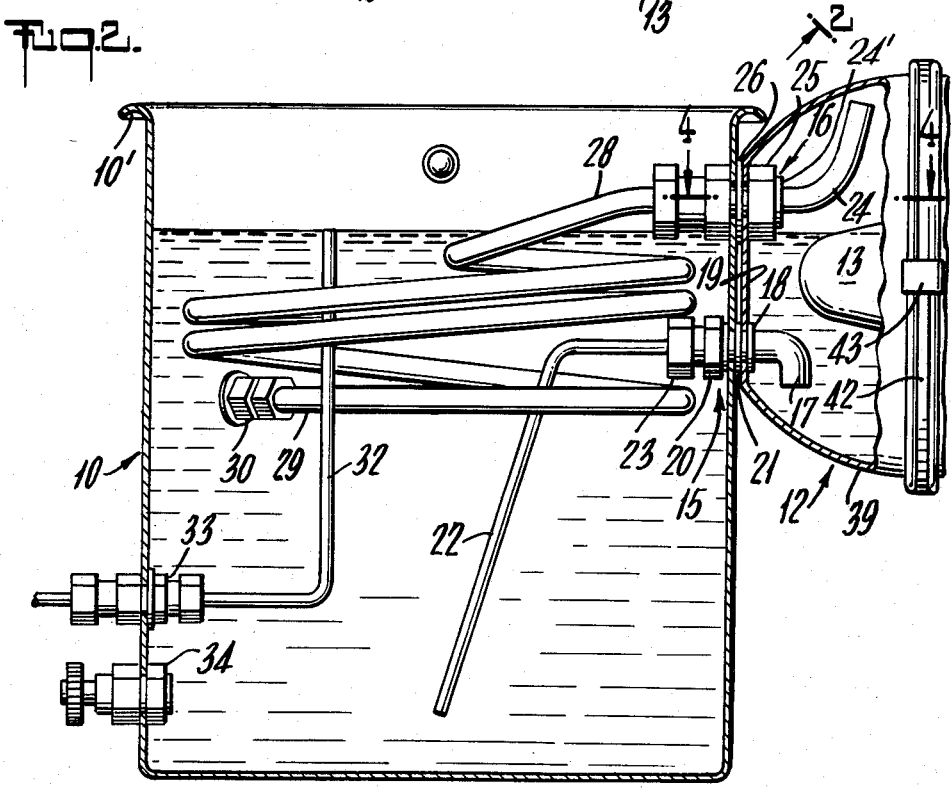

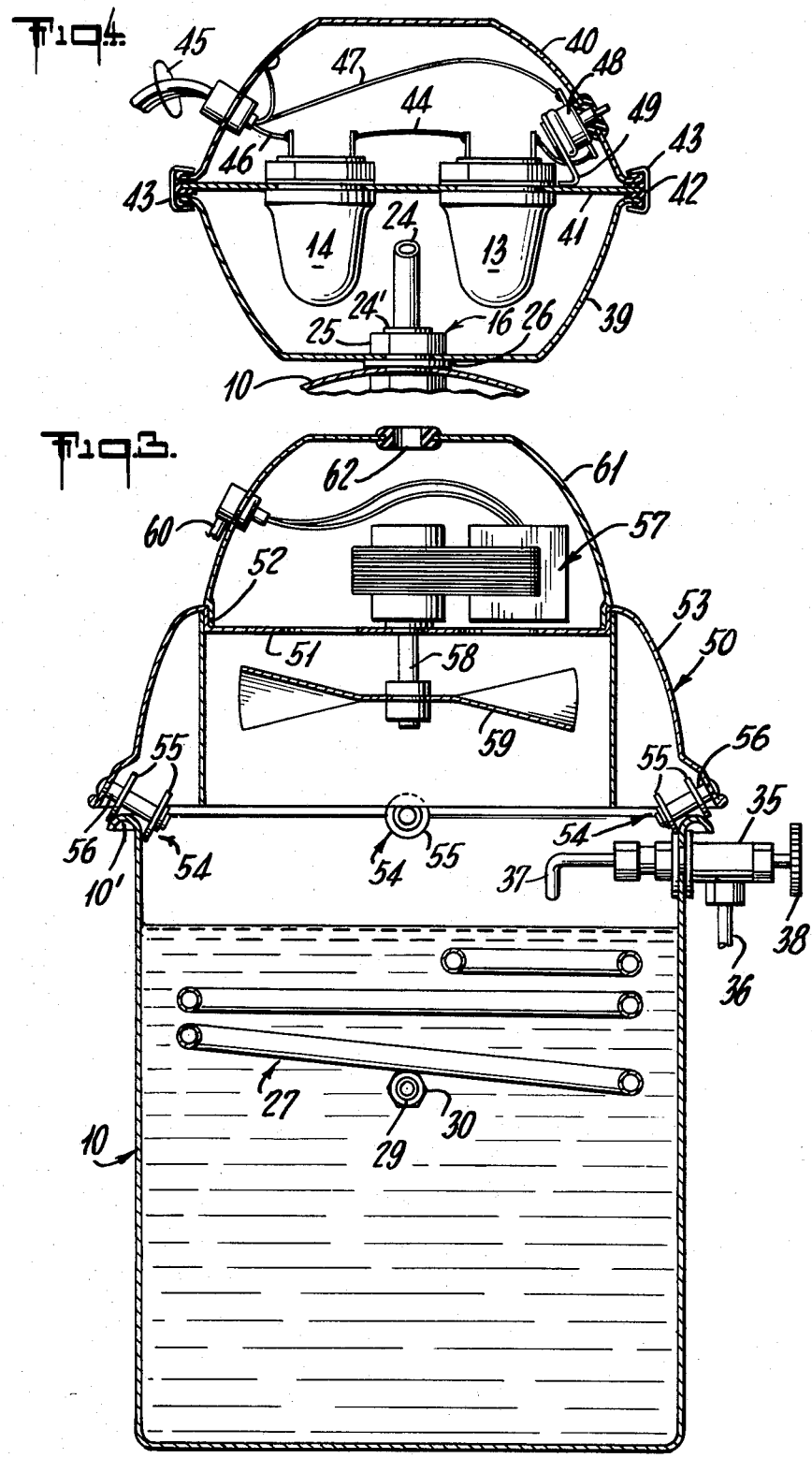

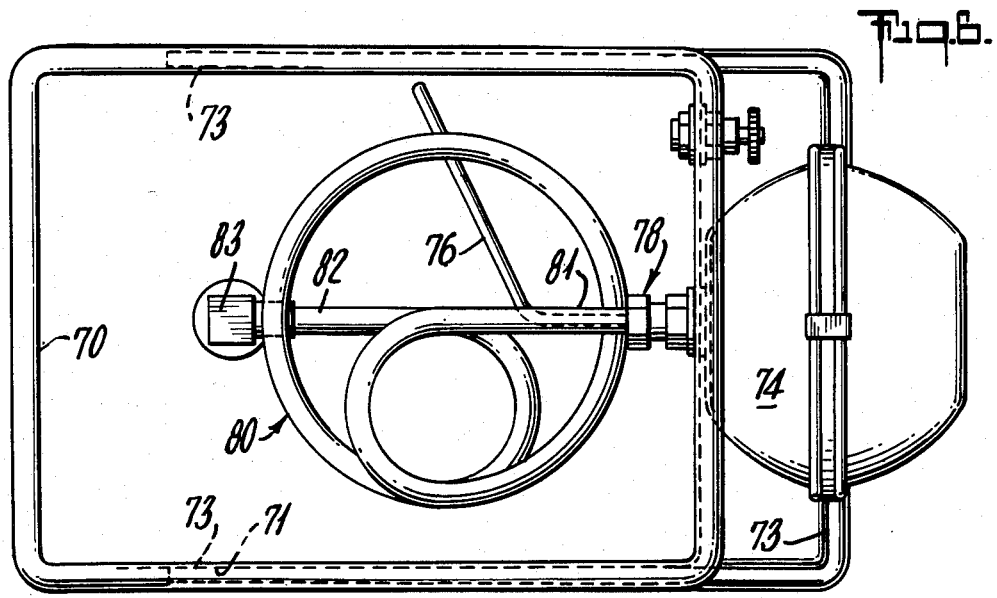
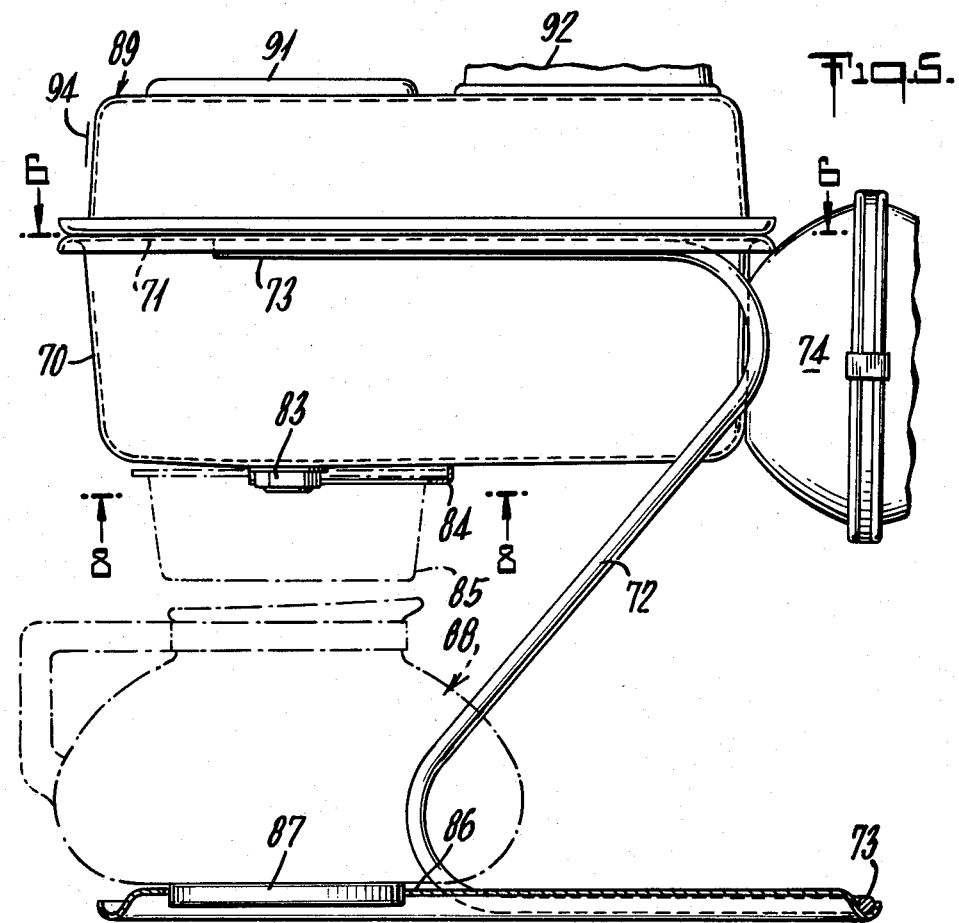

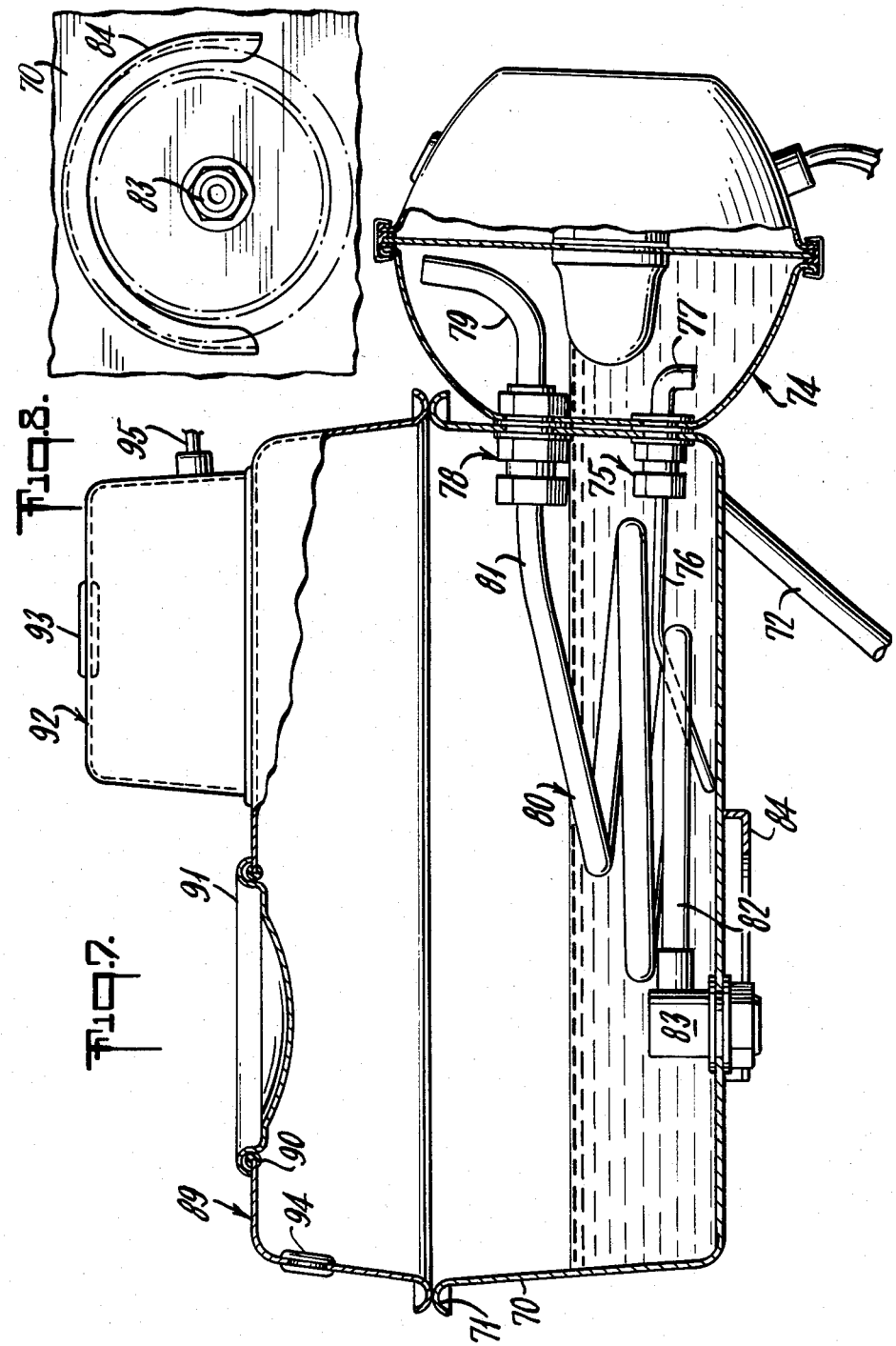

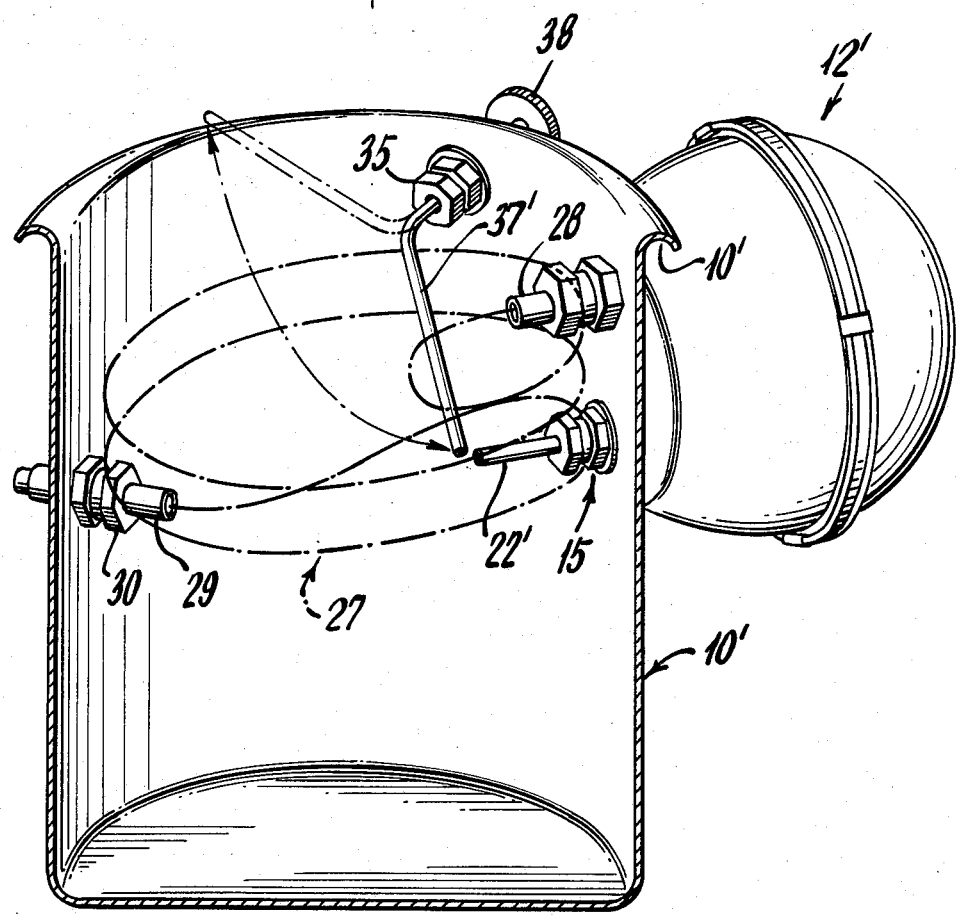

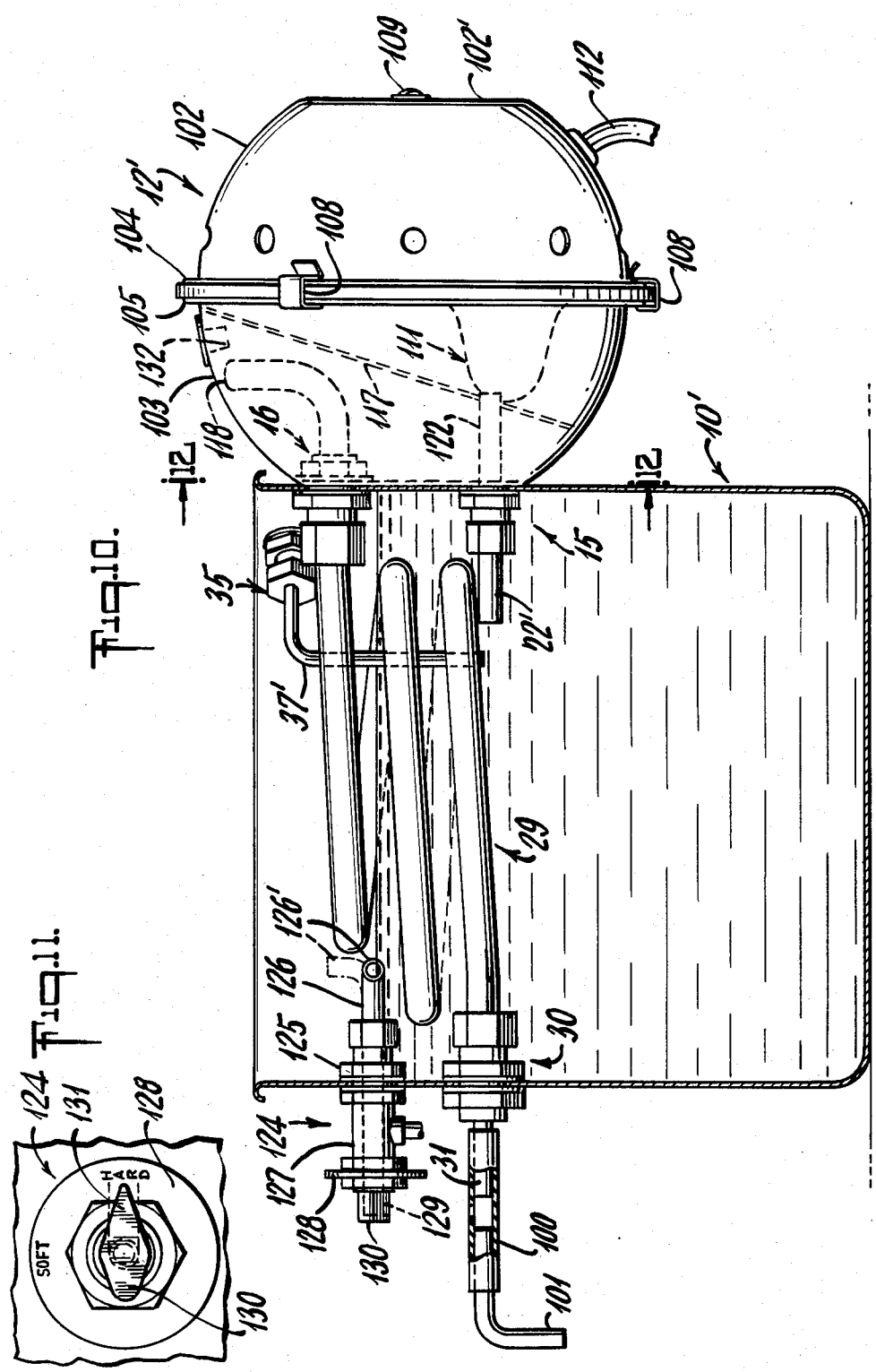

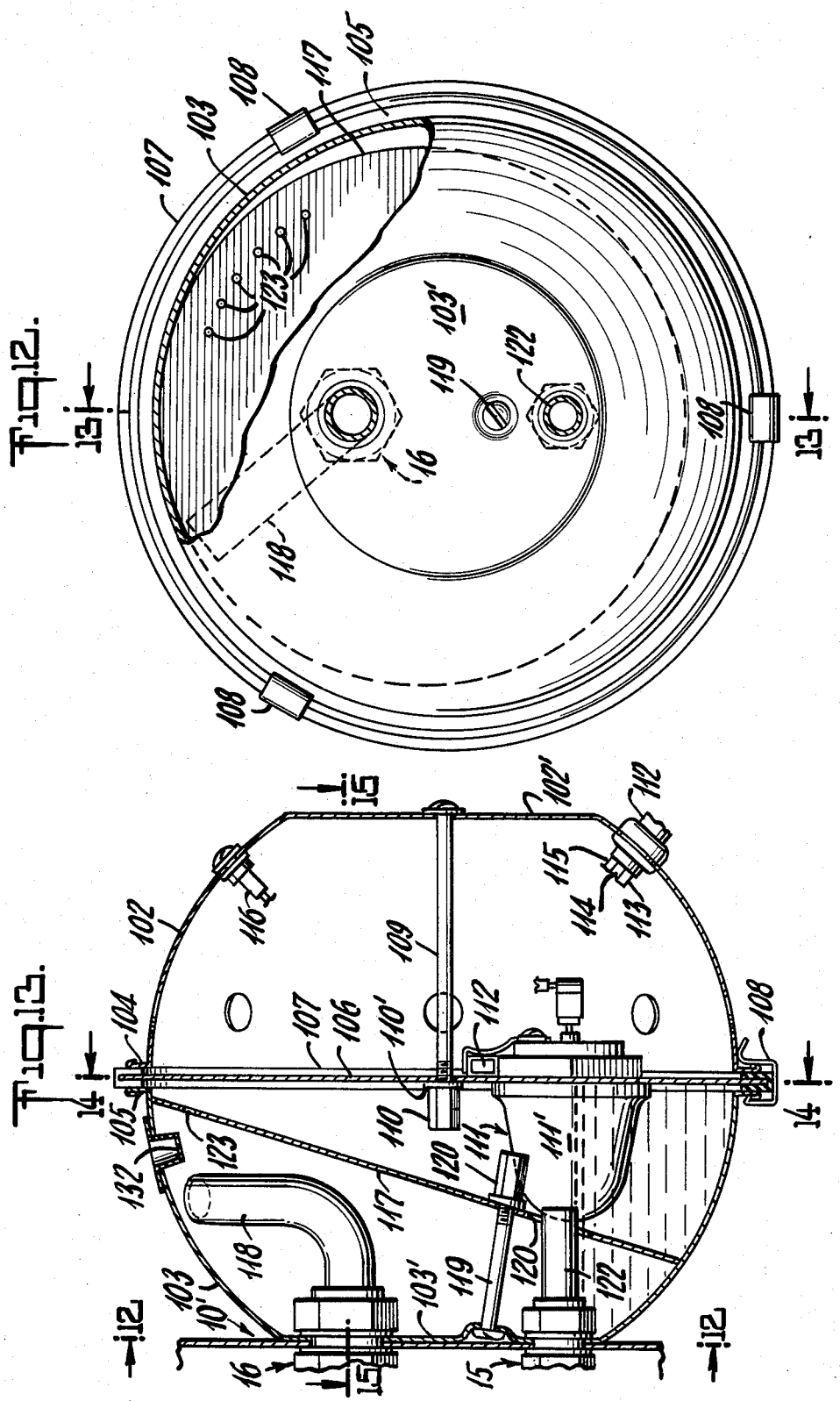

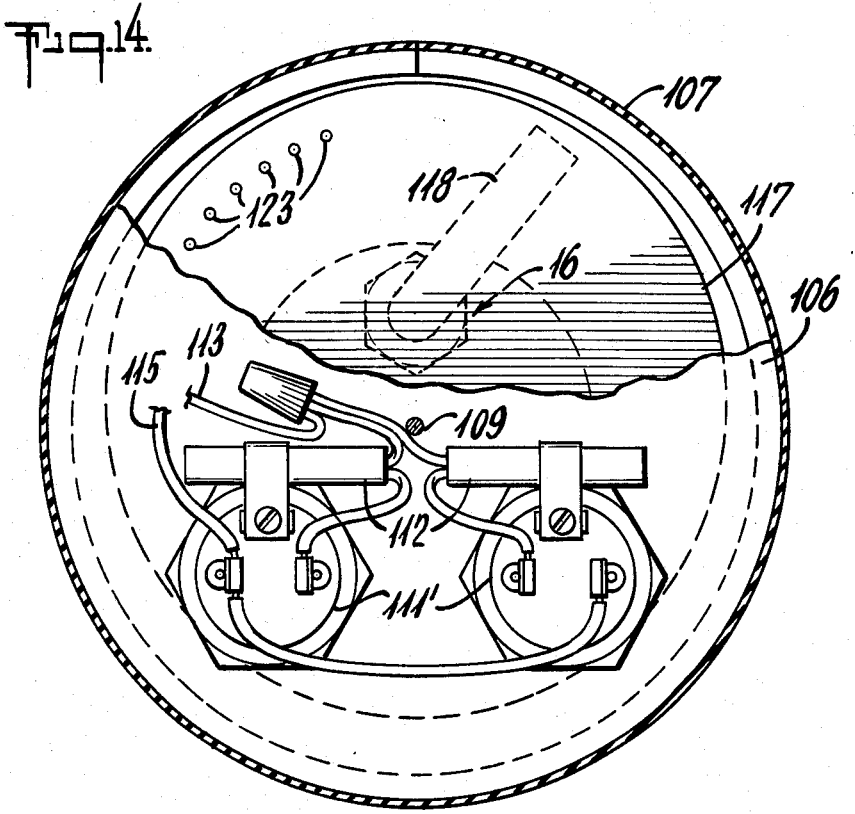
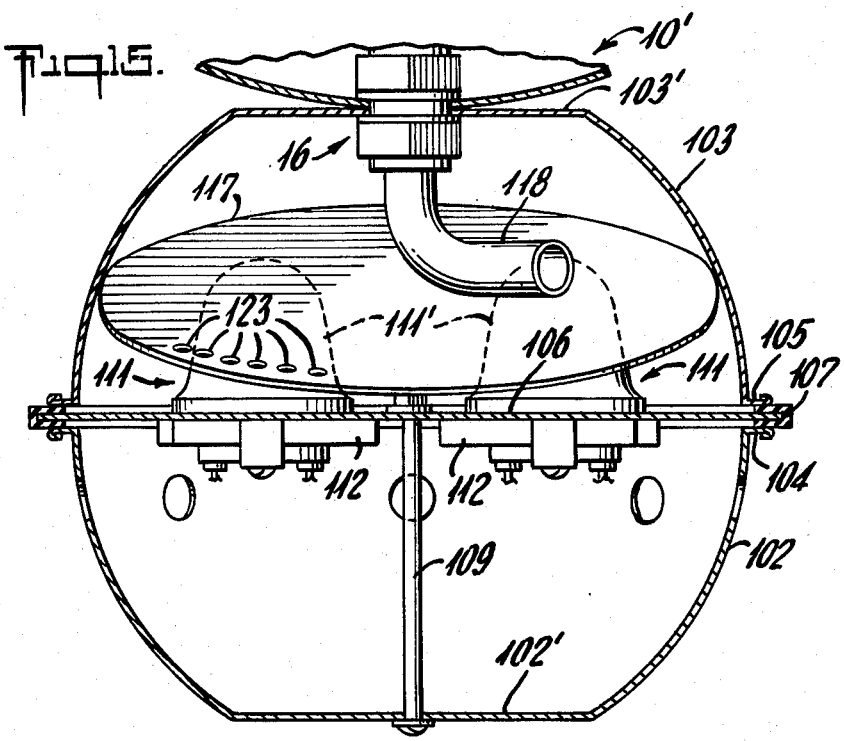

WATER DEGASIFICATION AND DISTILLATION APPARATUS

This application is a continuation-in-part of application Ser. No. 269,880 filed June 3, 1981 entitled "Water Degasification and Distillation Apparatus" now U.S. Pat. No. 4,420,374.

This invention relates to distilling apparatus and more specifically to novel and improved water distillation apparatus.

Known distilling apparatus generally involve the utilization of a closed boiler and means for continuously feeding water to the boiler. As the water in the boiler is heated to produce water vapor or steam, volatile chemical components of water having boiling points lower than the water will boil off and combine with the steam. The steam together with the volatile vaporized chemical components will then be condensed in a suitable condenser so that the resultant distillate will contain the volatile chemicals. In cases wherein the water has a disagreeable odor produced by sulphur compounds and the like, known apparatus tends to concentrate the odor and make the water even more distasteful. Applicant's prior U.S. Pat. No. 4,339,307 granted July 13, 1982 entitled: "Distillation Apparatus" discloses distilling apparatus embodying upper and lower chambers with the condensing coil disposed in the upper chamber which is normally filled with water and gradually fed into the lower chamber which is heated by a suitable means in order to produce steam. The steam is then fed upwardly through a condenser in the upper chamber and is then discharged from the condenser as a liquid. By operating the apparatus for a short period of time prior to the collection of the distilled water, the condenser will increase the temperature of the water in the upper chamber and boil off volatile chemical components.

This invention constitutes an improvement over prior known distilling apparatus including the apparatus disclosed in applicant's prior United States patent in that it embodies a novel and improved small boiler including instantaneous heating means, a condenser and a reservoir which provides an automatic supply of water to the boiler and may function to cool the condenser. With this arrangement, the water in the reservoir, as will be shown, circulates to and from the boiler to repeatedly interrupt boiling and heat thus imparted to the water in the reservoir together with the heat at least part of which may be imparted by the condenser will heat the water in the reservoir to a temperature that will effectively boil off chemical constituents of the water and the time required for operation of the distiller in order to produce a distillate free of chemicals and undesirable odors is materially reduced.

Another object of the invention resides in the provision of novel and improved water distillation apparatus which not only avoids control means for feeding water from a reservoir to a boiler but also embodies an arrangement and organization of elements wherein all portions of both the reservoir and boiler are readily accessible for cleaning and maintenance.

A still further object of the invention resides in the provision of hot distilled and substantially odor-free water for the brewing of coffee and tea as well as for use in the preparation of other foods such as soups and the like.

A still further object of the invention resides in the provision of a novel and improved water degasification and distillation apparatus characterized by its simplicity, ease of operation and maintenance and relativly low cost.

A still further object of the invention resides in the provision of a novel and improved boiler for the distillation of water which minimizes the accumulation of foam in the boiler caused by salts, detergents and other water contaminents which can contaminate the water being distilled.

The water degasification and distillation apparatus in accordance with the invention includes a container or tank adapted to receive the water to be distilled. A small boiler having heating elements mounted therein is preferably secured to one side of the tank and a fluid conduit couples the boiler to the tank so that the liquid level in the boiler will be controlled by the liquid level in the tank. A steam or vapor outlet in the boiler is coupled to a condenser preferably disposed within the tank and the outlet of the condenser extends through the wall of the tank. The condenser may be positioned in such a manner that the liquid in the tank will cover part or all of the condenser. With this arrangement and with the heaters in the boiler being energized, the liquid in the boiler will heat almost instantaneously and steam will be fed out through the condenser. As the pressure within the boiler exceeds the capacity of the outlet to receive steam or water vapor, pressure will force water in the lower portion of the boiler back into the tank. When the pressure is relieved, water will again flow into the boiler and this recirculation operation will continue during the operation of the distilling apparatus. Since hot water is being constantly returned to the tank and since heat is constantly removed from the condenser by the water within the tank, the water within the tank will increase in temperature and boil off undesirable chemicals contained in the water prior to distillation thereof. Cold water is preferably fed to the tank at the inlet to the boiler so that the boiler will receive cold water each time the boiler is refilled. Means may also be provided in association with the tank for feeding condensed distilled and degasified water into brewing apparatus for making coffee, tea or merely provide hot water for other purposes.

The above and other objects and advantages of the invention will become more apparent from the following description and accompanying drawings forming part of this application.

IN THE DRAWINGS

FIG. 1 is a fragmentary plan view of one embodiment of the distilling apparatus in accordance with the invention;

FIG. 2 is a cross sectional view of FIG. 1 taken along the line 2—2 thereof;

FIG. 3 is a cross sectional view of FIG. 1 taken along the line 3—3 thereof and illustrates air circulating means carried by the container;

FIG. 4 is a cross sectional view of the boiler and a fragmentary portion of the tank taken along the line 4—4 thereof of FIG. 2;

FIG. 5 is a side elevational view of a modified embodiment of the invention for producing distilled water for coffee and other foods;

FIG. 6 is a cross sectional view of FIG. 5 taken along the line 6—6 thereof;

FIG. 7 is a side elevational view in partial section of the water tank and boiler of FIG. 5;

FIG. 8 is a cross sectional view of FIG. 5 taken along the line 8—8 thereof;

FIG. 9 is a cross sectional view in perspective of a modified embodiment of a distiller in accordance with the invention;

FIG. 10 is a fragmentary cross sectional view of still another embodiment of the invention;

FIG. 11 is an elevational view of the water level control of FIG. 10;

FIG. 12 is an elevational view in partial section taken along the line 12—12 of FIG. 10;

FIG. 13 is a cross sectional view of FIG. 12 taken along the line 13—13 thereof;

FIG. 14 is a cross sectional view of FIG. 13 taken along the line 14—14 thereof; and FIG. 15 is a top view in partial section of the boiler shown in FIG. 10.

Referring now to the drawings and more specifically to FIGS. 1 through 4, the distilling apparatus in accordance with the invention comprises a cylindrical tank or container 10 having a pair of handles 11 secured to the side thereof. A boiler 12 having instantaneous heating elements 13 and 14 therein is affixed to the side of the tank 10 by the fluid connectors 15 and 16. The fluid connector 15 includes an elbow 17 having a shoulder 18 and a threaded shank extending through cooperating openings in the wall 19 of the boiler 12 and the wall of the tank 10. A nut 20 engages the shank of the fitting 15 and together with a resilient washer 21 provides a water-tight seal for both the tank 10 and the boiler 12. A water inlet tube 22 is fixedly coupled to the fitting 15 by means of a nut 23 so that water within the tank 10 will be automatically fed into the boiler 12 until the water level within the boiler corresponds to the water level in the tank. It will also be observed that the water level in the tank is preferably maintained at a level to effect total or at least substantial immersion of the heating elements 13 and 14 in the water within the boiler.

The steam outlet fitting 16 is of conventional construction and includes an outlet pipe 24, a threaded shank 24' extending through the walls of the tank and the boiler and secured thereto by a nut 25. A sealing washer 26 is disposed between the tank and the boiler to provide a water-tight connection. The condenser 27 in the instant embodiment of the invention is in the form of a coiled tube of metal such as stainless steel, copper or the like and has the inlet end portion 28 sealably connected to the fitting 16 within the tank 10. The outlet 29 of the condenser 27 has a fitting 30 extending through the wall of the tank 10 and provides the fluid outlet 31. The tank further includes an overflow pipe 32 which is connected to a fitting 33 sealed to the wall of the tank 10 and a drain cock 34 for draining liquid from the tank. A water inlet valve 34 is carried at the upper portion of the tank or container 10 and has an inlet 36, an outlet 37 within the tank and a hand-wheel 38 for regulating the water supply in order to maintain substantially constant level of the water within the tank.

The boiler is shown more clearly in FIG. 4 and consists of two housing elements 39 and 40. A circular wall or partition 41 is disposed between the housing elements 39 and 40 and includes a peripheral seal 42 which is releasably clamped between the outer rims of the housing elements 39 and 40 by clips 43 about the periphery of the boiler 12. This arrangement completely seals the chamber formed by the housing portion 39 and the wall 41 and the boiler can be readily disassembled for cleaning. The heating elements 13 and 14 in the instant embodiment of the invention are carried by the wall 41 and are connected in series by a lead 44 connecting one terminal of one heater to one terminal of the other heater. The power line 45 has one lead 46 connected to the other terminal of the heater 14 while the second lead 47 is connected through a thermostat 48 to the other terminal of the heater 13. The thermostat is mounted on a bracket 49 in close proximity to the heater 13 and in the event the heater 13 reaches a temperature above the normal operating temperature, the thermostat will operate to open the circuit and de-energize both heaters 13 and 14. It is evident however that heaters 13 and 14 could be arranged for parallel operation or in the alternative, a single heater may be employed provided however it delivers the quantity of heat necessary for operation of the apparatus.

If desired, the tank or container 10 may be provided with a conventional cover having openings therein or in the alternative may utilize forced air circulation means for the removal of undesirable vapors liberated from the liquid within the tank 10 during the course of the distillation process. One embodiment of air circulating means is illustrated in FIG. 3. The air circulating means includes an inverted dished cover generally denoted by the numeral 50 which includes a flat upper wall 51, an upwardly extending peripheral wall 52 and a downwardly curved peripheral wall 53. The lower peripheral edge of the wall 53 carries three or more angularly disposed rollers 54 each having spaced discs 55 rotatably carried by a shaft 56. The discs 55 engage the rolled edge 10' of the tank 10 and accordingly provide an annular vent between the cover 15 and the edges of the tank 10.

The wall 51 of the air circulating means shown in FIG. 3 includes a motor generally denoted by the numeral 57 which has a shaft 58 extending through the perforated wall 51 and carries a fan 59. Power is fed to the motor 57 by a cable 60 connected in a conventional manner to the motor. If desired, switch means may be provided for operation of the fan. The fan motor is covered by a dome-shaped housing 61 securely fitted to the cover 53 and secured thereto by any suitable means. In the instant embodiment of the invention, the dome-shaped housing 61 is adapted to frictionally engage the peripheral wall 52 of the cover 50. In operation, air is drawn in through an opening 62 and the perforated wall 51 whereupon it is directed downwardly over the water in the container and discharged through the annular opening between the container 10 and cover 50.

In the operation of the distillation apparatus described above, the tank 10 and boiler 12 are first filled with water to a level at least substantially covering the heating elements 13 and 14 as will be observed more clearly in FIG. 2. It will be observed that when filling the tank 10, water will automatically flow through conduit 22 into the boiler so that the level of the water in the tank will be the same as the water level in the boiler. Energy is then supplied to the heating elements 13 and 14 which will function to boil the water within the boiler 12. Steam from the boiler will emerge through the outlet 24 and then flow through the condenser 17 and the condensed steam will then be discharged as a liquid from the outlet 31. When initially operating this apparatus, it is generally desirable to discard the distillate until the water within the tank 10 has attained a normally operated temperature which is rapidly attained in the following manner. Heaters 13 and 14 are designed to heat the water within the boiler at a rate faster than the condenser 27 can accommodate the steam produced. Accordingly, pressure is developed within the boiler 12 and will force liquid from the boiler through the tube 22 back into the tank 10. As soon as the pressure is relieved within the boiler, water will again blow through the tube 22 back into the boiler with the result that there will be a periodic reversal of water flow through the tube 22. This action results in a substantial increase in temperature of the water within the tank 10 and contributes to the heat imparted to the water in the tank 10 by the action of the condenser 27. The temperature of the water tank 10 however is always below the boiling temperature and should preferably be in the range of 180° F. to 190° F. in order to be certain that undesirable components in the water are boiled off prior to actual distillation.

In one form of the invention utilizing a tank 10 having a volume of 1 to 2 gallons of water, a boiler 12 holding approximately 16 ounces of water, heating elements designed to dissipate from 1,500 to 2,000 watts, it will take approximately 15 minutes of operation for the water in the tank to reach a temperature of approximately 180° F. to 190° F. and the boiler will normally heat tap water above the boiling point within about 45 seconds. With this arrangement and after the warm-up period, substantially all volatile chemicals in the water are boiled off prior to distillation with the result that the distillate is substantially odorless and free of all undesirable components. In actual tests, it has been found that with distillation apparatus as described above, distilled water will be produced at the rate of one-half to three-quarters of a gallon per hour.

A modified form of the invention is illustrated in FIGS. 5 through 8. This form of the invention is intended for the brewing of coffee and for the production of hot distilled water for other purposes such as the brewing of tea, making of soups and the like.

It will become apparent from the following description of FIGS. 5 through 8 of the drawings that the operation of the brewer is substantially identical to the operation of the form of the invention shown in FIGS. 1 through 4. More specifically, the brewer comprises a tank or container 70 having an outwardly formed peripheral lip 71. The container is supported by a pair of Z-shaped brackets 72 coupled by a transverse element 72 which maintains the two brackets 72 in spaced relationship. The container 70 is supported by the upper horizontal bracket portions 73 which engage the peripheral lip 71 on the sides of the container 70. A boiler 74 substantially identical to the boiler 12 shown on FIG. 4 is affixed to one end of the container 70. Since the boiler functions in the same manner as the boiler 12 and is substantially identical thereto, a further description is not deemed necessary.

The boiler 74 is coupled to the container 70 by a fitting 75 having a water inlet 76 secured to one side thereof and a water outlet 77 disposed within the boiler 74. A second fitting 78 extends through the walls of the container 70 and boiler 74 and carries a stream outlet 79 on one end thereof. Within the container, the inlet end 81 of the condenser 80 is affixed to the fitting 78 and the outlet end 82 of the condenser is secured to a fitting 83 extending through an opening in the bottom of the container 70.

The underside of the container 70 as shown in FIGS. 5 and 8 includes in the instant embodiment of the invention a semicircular bracket 84 of L-shaped section for slidably receiving a basket 85 illustrated in broken-lines in FIG. 5 which may normally hold a filter and ground coffee. A base 86 engages and supports the Z-shaped bracket 72 and includes a conventional electric heating element 87. The heating element 87 is provided with suitable energizing conductors and switching means not shown so that it may be turned on and off as desired. The space between the bottom of the basket 85 and the top of the heating element 87 is of sufficient magnitude to receive a suitable receptacle 88 for receiving brewed coffee. It is obvious from the foregoing discussion that the basket 85 may be arranged to accommodate tea leaves for the brewing of tea or in the alternative the distilled water from the fitting 83 can be fed directly into the receptacle 88 for making soup or any other purpose for which purified distilled water may be required.

The container 70 includes a dished cover generally denoted by the numeral 89 which may be affixed to the container 70 by any suitable means. The cover 89 includes an opening 90 for feeding water into the container 70 and a cooperating lid 91. Forced air circulating means generally denoted by the numeral 92 is carried on the top side of the cover 91 and includes an electric motor and fan substantially similar to that illustrated and described in connection with FIG. 3. The air circulating means includes an air inlet opening 93 on the top side thereof and appropriate openings not shown are formed in the top of the cover 89 to permit the introduction of air into the space defined by the container 70 and lid 89. The air is exhausted from one or more outlets 94 in the cover and an electric cable 95 is utilized for energizing the fan and may include appropriate switch means.

The operation of the apparatus illustrated in FIGS. 5 through 8 is substantially identical to that described in connection with the preceding embodiment of the invention. However, since the device is not arranged, though it may be, for the continuous distillation of water, the container is initially filled with water so that the level is just below the position of the inlet 81 of the condenser 80. If the container 70 is of sufficient size, the distillation process can continue until the vessel 88 has been filled. If larger amounts of distilled water are required, additional water can be added through the opening 90 as may be required in order to maintain the level of the water in the container at a height that will cause the heating elements in the boiler 74 to be at least partially covered.

Referring now to the forms of the invention shown in FIG. 9 and FIGS. 10 through 15, it has been found that improved results can be obtained by feeding the water supply controlled by the water inlet valve 35 as shown for instance in FIG. 1, through an elongated tube 37' which terminates adjoining the boiler inlet 22'. The water inlet tube 37' is preferably arranged to swivel as indicated in FIG. 9 so that it can be raised to facilitate adjustment of the water feed to just maintain the desired water level in the container 10 as described in connection with FIGS. 1 and 2. It will be observed that the water inlet 22' to the boiler is a straight tube leading directly to the lower portion of the boiler and in addition to receiving cold inlet water directly from the tube 37', the tube 22' is easier to clean as will be discussed in more detail in connection with FIGS. 10 through 15.

It has been found in the distillation of water that the presence of salts, detergents and other similar chemicals tend to cause the generation of foam in the boiler which adversely affects the ultimate distillate and also necessitates more frequent cleaning of the apparatus to attain optimum results. A structure for achieving these ends is illustrated in FIGS. 10 through 15 wherein the container for receiving the water supply is generally denoted by the numeral 10′ while the boiler is generally denoted by the numeral 12″. The boiler 12′ is secured to the container 10′ in the same manner as described in connection with FIGS. 1 and 2 in that lower and upper sealed fittings 15 and 16 secure the boiler to the container and at the same time provide a lower water inlet and an upper steam outlet. The end of the fitting 16 disposed with the container 10 is coupled to the inlet of condenser 29 and the outlet of condenser 29 is connected to an outlet fitting 30 which includes distilled water discharge means having a pipe 31, an elastic coupling 100 and an elbow 101 to facilitate collection of the distilled water in a suitable receptacle. The inlet pipe 22′ extends through the fitting 15 and into the boiler in a manner to be described in connection with the succeeding figures.

Referring now to FIGS. 12 through 15, the boiler is formed of two truncated hemispherical or bowl-like portions 102 and 103 having integrally formed closed bottom portions 102′ and 103′ respectively. The boiler section 102 is provided with a peripheral flange 104 while the boiler section 103 is provided with a similar peripheral flange 105. The boiler sections 102 and 103 are separated by a separate plate or partition 106 having a diameter just slightly greater than the diameter of the peripheral flanges 104 and 105. An annular U-shaped gasket 107 is fitted about the edge of the partition 106 and a plurality of clips 108 engage the peripheral flanges 104 and 105 to secure the boiler portions one to the other and at the same time seal the boiler 103. For convenience of assembly, the partition 106 with the gasket 107 is secured in position relative to the boiler section 102 by an elongated screw 109 extending through the end wall 102′ of the boiler section 102 and through a central opening in the partition and is secured in place by a suitable nut 110 and sealing washer 110′.

A pair of heaters 111 identical to the heaters 13 and 14 of FIGS. 1 and 2 are carried by the partition 106 and are disposed slightly below the central axis of the boiler. As shown in FIG. 14, each heater includes its individual thermostat 112 with each heater and thermostat being connected in series. The series connected heaters with their associated thermostats are then connected in parallel as shown in FIG. 14 so that line voltage is applied to each heater and each heater is individually protected against overheating. The heating elements of each of the heaters 111 is disposed within the boiler section 103 and is enclosed by a water impervious housing 111′ which not only protects the heating element but also seals the heater against the partition 106. The heaters are energized by a power cable 112 having three conductors 113, 114 and 115. The conductor 114 is a ground conductor and is connected to the grounding screw 116 while the conductors 113 and 115 are connected to the heating elements as illustrated in FIG. 14.

As previously pointed out, water for drinking and other purposes often contains relatively large quantities of salts, detergents and other chemicals which produce substantial quantities of foam during the distilling process and it is of course desirable to prevent the foam from entering the condenser 29. For this purpose, a baffle 117 is angularly disposed within the boiler housing 103. As viewed in FIGS. 10 and 13, the baffle which is of circular configuration is inclined downwardly and to the left so that the L-shaped steam outlet 118 which is coupled to the fitting 16 lies to the left of the baffle as viewed in these figures while the heaters 111 are on the right side of the baffle. The baffle is held in place by a bolt 119 carried by the wall 103′ of the boiler section 103 and extending through an opening in the baffle 117 to receive a cooperating nut 120 to hold the baffle in position. The baffle also includes a centrally disposed opening 121 to receive the end of a water inlet tube portion 122 extending inwardly from the fitting 15 previously described. The steam outlet tube as viewed in FIG. 12 preferably lies between 30° and 50° to the left of vertical and the baffle 117 includes a plurality of small holes 123 disposed well to the right of the center line of the boiler 103. With this arrangement, foam will be generated principally on the heater side of the baffle 117 with the result that the baffle will tend to confine the foam with only the steam or water vapor passing through the openings 123 to the steam outlet 118. Furthermore, since the steam outlet 118 is angularly disposed relative to the openings 123, foam which may possibly pass through the openings 123 will not reach the steam outlet 118 easily and accordingly only the steam will pass through the steam outlet. This action results in the attainment of much purer water than in the case where foam can reach the steam outlet and ultimately be recombined with the distillate.

Referring again to FIGS. 10 and 11, the container 10′ includes an overflow control assembly generally denoted by the numeral 124. This assembly includes a fitting 125 extending through the wall of the container 10′ and carrying an L-shaped tube 126 rotatably disposed within the fitting. A housing portion 127 rotatably receives the tube 126 and supports a fixed scale 128 having soft and hard positions as illustrated more clearly in FIG. 11. A shaft 129 extends from the housing 127 and is mechanically coupled to the tubular member 126 so that rotation of the shaft 129 will rotate the tube 126 to move the angularly disposed end portion 126′ of the tube 126 to either a horizontal position or a vertical position as illustrated. A knob 130 having a pointed portion 131 is carried by the shaft 129 and facilitates rotation of the shaft to one or the other of the positions. With this arrangement, should the water be relatively hard, the pointer 130 is moved to the horizontal position to limit the quantity of water delivered to the boiler while at the vertical position, the quantity of water delivered to the boiler is increased. The vertical position is used when relatively soft water is encountered since the vertical position will provide increased water to the boiler and greater output without any adverse affect on the distillate. The horizontal position results in a reduction of the quantity of distillate produced. It is to be understood that the lower water level will always produce the superior distillate.

In order to avoid damage to the gasket 107 surrounding the partition 106 in the event pressure should develop within the boiler 103 exceeding the desired pressure, a plug 132 formed of plastic material is loosely inserted in a cooperating opening at the top of the boiler as will be observed more clearly in FIGS. 10 and 13. The pressure required to dislodge the plug 132 is extremely small so that there is no possibility whatsoever of rupturing the boiler 103 or even dislodging the resilient sealing member 107. In the event one or both of the heating elements 111 should become damaged or burned out, the section 102 together with the partition 106 can readily be removed from the boiler for replacement or repair. At the same time, it is quite obvious that by reason of the unique arrangement and construction of the distiller in accordance with the invention, that all portions are readily accessible for cleaning.

In the operation of the distiller in accordance with the invention including the forms of the invention shown in FIGS. 1 and 2 as well as FIGS. 10 and 13, the boiler is positioned relative to the container 10 or 10' as the case may be so that the water will completely or substantially immerse the heating elements. The heating elements function to heat the water very rapidly and as a result create a pressure within the boiler which forces the water out of the boiler and back into the container. In FIGS. 1 and 2 since the hot water will rise within the container 10, cooler water will then be fed back into the boiler but in the meantime boiling has been completely interrupted. In FIGS. 10 and 13 while the water does not entirely expose the heaters when discharged from the boiler, upon feeding of cold water from the inlet pipe 37' directly to the inlet 22' to the boiler, the cold water will terminate boiling at least momentarily whereupon the heating and discharging process is again repeated. It has been found in both forms of the invention that exceedingly pure water is obtained which is not obtainable with any other known devices of comparable size and rate of distillation. In the form of the invention shown in FIGS. 10 and 13, when the water level is adjusted to the low level, the purest water is obtainable while at the high level, the water will meet prescribed standards for distilled water. The high level is provided particularly for use with water having low total dissolved solids and other impurities since the apparatus will deliver as much as three quarters of a gallon of distilled water per hour while the apparatus with water at the low level will deliver one-half a gallon per hour.

While only certain embodiments of the invention have been illustrated and described, it is apparent that alterations, changes and modifications may be made without departing from the true scope and spirit thereof.

What is claimed is:

1. Water degasification and distillation apparatus comprising a container for holding water to be degasified and distilled, a condenser in said container having an inlet and outlet, a boiler of relatively small volume, a lower water inlet on said boiler and communicating with said container at a point substantially below the level of the water in said container for feeding water freely to and from said boiler, said boiler being positioned relative to said container to normally maintain a predetermined water level within said boiler, an upper outlet on said boiler above said predetermined water level and communicating with the inlet of said condenser, and means for heating water in said boiler and periodically ejecting it therefrom including a heating element in said boiler and generating heat at a temperature sufficient to produce steam at a greater rate than said steam can be discharged from said upper outlet creating a pressure in said boiler sufficient to force water in said boiler back into said container through said lower water inlet until the pressure in said boiler is relieved and boiling interrupted whereupon water will again flow into said boiler to said predetermined level, said boiler being formed of a single open-sided housing and a readily accessible cover plate removably sealed to said open side for ready access to the boiler.

2. Water degasification and distillation apparatus according to claim 1 wherein said container includes a cover and air circulating means carried by said cover, said air circulating means directing air into said container and said cover including means for discharging said air from said container whereby vapors produced within said container are discharged into the atmosphere.

3. Water degasification and distillation apparatus according to claim 2 wherein said cover has a convex configuration, said air circulating means is in the form of an electric fan having a fan motor carried by said cover and fan blades affixed to the motor shaft, said cover including openings for the admission of air and means about the edge thereof for engaging said container and holding the edge of said cover in spaced relationship to said container to provide for the discharge of air circulated by said fan.

4. Water degasification and distillation apparatus according to claim 1 including means for supporting said container above a supporting surface, and said condenser outlet extending through the bottom wall of said container whereby a vessel may be disposed beneath said container and in line with said condenser outlet to receive the distilled water.

5. Water degasification and distillation apparatus according to claim 4 including means on the underside of said container and surrounding said condenser outlet for supporting a basket having an opening in the bottom thereof for receiving and holding a filter containing ground coffee, tea or the like whereby said distilled water will first flow into said basket and thence into said vessel.

6. Water degasification and distillation apparatus according to claim 1 wherein said boiler is formed of a hollow, substantially hemispherical housing having a peripheral flange extending from the open end portion and positioned in a vertical plane, said cover plate conforming to the size and configuration of said flange and a gasket disposed between said boiler and plate and means removably securing said plate and gasket to said flange.

7. Water degasification and distillation apparatus comprising a container for holding water to be degasified and distilled, a boiler of relatively small volume, a lower water inlet on said boiler and communicating with said container for feeding water to said boiler, said boiler being positioned relative to said container to normally maintain a predetermined water level within said boiler, a condenser, an upper outlet on said boiler above said predetermined water level and communicating with the inlet of said condenser, and heating means in said boiler and generating heat at a temperature sufficient to produce steam at a greater rate than said steam can be discharged from said upper outlet creating a pressure in said boiler sufficient to force water in said boiler back into said container through said lower water inlet until the pressure in said boiler is relieved whereupon water will again flow into said boiler to said predetermined level, said boiler being formed of a single open-sided housing and a readily accessible cover plate removably sealed to said open side for ready access to the boiler, said boiler being formed of a hollow, substantially hemispherical housing having a peripheral flange extending from the open end portion and positioned in a vertical plane, said cover plate conforming to the size and configuration of said flange and a gasket disposed between said boiler and plate and means removably securing said plate and gasket to said flange, said heating means being an electric heater carried by said plate with the electrical connections therefor disposed on the outer side of said plate and a second hollow, substantially hemispherical housing including a peripheral flange enclosing said electrical connections and said housings with said cover plate being removably secured one to the others.

8. Water degasification and distillation apparatus comprising a container for holding water to be degasified and distilled, a condenser in said container having an inlet and outlet, a boiler of relatively small volume, a lower water inlet on said boiler and communicating with said container at a point substantially below the level of the water therein for feeding water freely to and from said boiler, said boiler being positioned relative to said container to normally maintain a predetermined water level within said boiler, an upper outlet on said boiler above said predetermined water level and communicating with the inlet of said condenser, and means for heating water in said boiler and periodically ejecting it therefrom including a heating element in said boiler and generating heat at a temperature sufficient to produce steam at a greater rate than said steam can be discharged from said upper outlet creating a pressure in said boiler sufficient to force water in said boiler back into said container through said lower inlet until the pressure in said boiler is relieved and boiling interrupted whereupon water will again flow into said boiler to said predetermined level, said boiler being formed of a single open-sided housing and a readily accessible cover plate removably sealed to said open side for ready access to the boiler, said boiler being formed of hollow, substantially hemispherical housing having a peripheral flange extending from the open end portion and positioned in a vertical plane, and said cover plate conforming to the size and configuration of said flange and a gasket disposed between said boiler and plate and means removably securing said plate and gasket to said flange, said hollow, substantially hemispherical housing including an inclined baffle with said steam outlet lying on one side of the baffle and said heating means on the other side of the baffle, said water inlet feeding water to the heater side of said baffle and said baffle further including at least one opening adjoining the top edge and angular spaced from the steam outlet.

9. Water degasification and distillation apparatus comprising a container for holding water to be degasified and distilled, a condenser in said container having an inlet and outlet, a boiler of relatively small volume, a lower water inlet on said boiler and communicating with said container at a point substantially below the level of the water therein for feeding water freely to and from said boiler, said boiler being positioned relative to said container to normally maintain a predetermined water level within said boiler, an upper outlet on said boiler above said predetermined water level and communicating with the inlet of said condenser, and means for heating water in said boiler and periodically ejecting it therefrom including a heating element in said boiler and generating heat at a temperature sufficient to produce steam at a greater rate than said steam can be discharged from said upper outlet creating a pressure in said boiler sufficient to force water in said boiler back into said container through said lower water inlet until the pressure in said boiler is relieved and boiling interrupted whereupon water will again flow into said boiler to said predetermined level, said boiler being formed of a single open-sided housing and a readily accessible cover plate removably sealed to said open side for ready access to the boiler, said boiler including a baffle dividing said boiler into two portions with said upper steam outlet disposed on one side thereof and said heating means and lower water inlet on the other side thereof and said baffle includes at least one upper opening angularly displaced from said upper steam outlet.

10. Water degasification and distillation apparatus according to claim 1 wherein said boiler is formed of a hollow, substantially hemispherical housing having a peripheral flange extending from the open end, said boiler being affixed to the outer side of said container with at least said lower water inlet extending through said housing and container, a feed water inlet carried by said container for feeding water to said container in the vicinity of the boiler water inlet, and a water overflow outlet carried by said container to maintain a constant water level in said container.

11. Water degasification and distillation apparatus comprising a container for holding water to be degasified and distilled, a boiler of relatively small volume, a lower water inlet on said boiler and communicating with said container for feeding water to said boiler, said boiler being positioned relative to said container to normally maintain a predetermined water level within said boiler, a condenser, an upper outlet on said boiler above said predetermined water level and communicating with the inlet of said condenser, said heating means in said boiler and generating heat at a temperature sufficient to produce steam at a greater rate than said steam can be discharged from said upper outlet creating a pressure in said boiler sufficient to force water in said boiler back into said container through said lower water inlet until the pressure in said boiler is relieved whereupon water will again flow into said boiler to said predetermined level, said boiler being formed of a single open-sided housing and a readily accessible cover plate removably sealed to said open side for ready access to the boiler, said boiler being formed of a hollow, substantially hemispherical housing having a peripheral flange extending from the open end, said boiler being affixed to the outer side of said container with at least said lower water inlet extending through said housing and container, a feed water inlet carried by said container for feeding water to said container in the vicinity of the boiler water inlet, and a water overflow outlet carried by said container to maintain a constant water level in said container, said water overflow outlet comprising a horizontally disposed water discharge tube rotatably carried by a fitting extending through the wall of said container, the inner end of said tube being angularly disposed relative to the remainder of the tube, means on the outside of said container and coupled to said tube for rotation thereof whereby the level of the water in said container can be changed by angularly positioning the inner end of said tube.

12. Water degasification and distillation apparatus comprising a container for holding water to be degasified and distilled, a boiler of relatively small volume, a lower water inlet on said boiler and communicating with said container for feeding water to said boiler, said boiler being positioned relative to said container to normally maintain a predetermined water level within said boiler, a condenser, an upper outlet on said boiler above said predetermined water level and communicating with the inlet of said condenser, and heating means in said boiler and generating heat at a temperature sufficient to produce steam at a greater rate than said steam can be discharged from said upper outlet creating a pressure in said boiler sufficient to force water in said boiler back into said container through said lower water inlet until the pressure in said boiler is relieved whereupon water will again flow into said boiler to to said predetermined level, said boiler being formed of a single open-sided housing and a readily accessible cover plate removably sealed to said open side for ready access to the boiler, said boiler comprising a substantially round bowl-shaped housing having an outwardly extending flanged rim and a flattened bottom disposed in a vertical plane and smaller in diameter than said rim, said lower water inlet extends through said bottom, said upper outlet extends through said bottom and carries a tube within said boiler housing curved upwardly and at an angle relative to a vertical plane normal to said bottom and a plate conforming to said flange secured in sealed relationship to said flanged rim.

13. Water degasification and distillation apparatus according to claim 12 wherein said heating means comprises at least one waterproof electric heater carried by said plate with the electric terminals disposed on the outer side of said plate.

14. Water degasification and distillation apparatus according to claim 13 wherein said boiler housing includes a baffle dividing said housing into two separate chambers with said upper outlet being disposed on one side of said baffle, said heating means disposed on the other side of said baffle and said lower water inlet feeding water to the heater side of said baffle and said baffle including at least one opening near the upper edge thereof and angularly positioned relative to said upper steam outlet.

15. Water degasification and distillation apparatus according to claim 14 wherein said condenser is disposed within said container, said boiler housing is secured to the outer wall of said container with the upper outlet and lower inlet extending through the wall of said container, means for feeding water to said container and a container overflow to maintain a water level in said container that will cause said boiler housing to be normally filled to said predetermined level.

* * * * *